Aug. 19, 1969 L. H. LEE 3,462,659

MOVABLE MEMBER POSITION SERVO SYSTEM

Filed Oct. 27, 1966 2 Sheets-Sheet 1

INVENTOR.
LESTER H. LEE
BY Robert G. Clay
ATTORNEY

MOVABLE MEMBER POSITION SERVO SYSTEM

Filed Oct. 27, 1966 2 Sheets-Sheet 2

INVENTOR.
LESTER H. LEE

BY Robert S. Clay

ATTORNEY 3,462,659

MOVABLE MEMBER POSITION SERVO SYSTEM

Lester H. Lee, Mountain View, Calif., assignor to Ampex Corporation, Redwood City, Calif., a corporation of California Filed Oct. 27, 1966, Ser. No. 595,558
Int. Cl. H02p 7/00; G11b 15/44
U.S. Cl. 318—6 10 Claims

ABSTRACT OF THE DISCLOSURE

A movable member servo system adaptable as a reel drive system for magnetic tape transports using tape loop storage chambers wherein said system would include means for generating signals representative of the rate of change of the tape loop position within said storage chambers and signals representative of reel motor current. The signals representative of motor current are combined with the loop change rate signals and compensate for the lag between the motor response and actual tape position. The system generates a continuous bipolar signal that follows the tape position in either direction of operation, and stability controls the reel servomotor under a wide variety of conditions.

This invention relates to systems for controlling drive systems in response to the position of a variable position member, and more particularly to reel drive systems for magnetic tape transports using tape loop storage chambers.

Servo systems for controlling the position of an element moving at high speed and subject to rapid changes of position have been developed for a considerable number of applications. A particularly critical example of systems in which such conditions are encountered is found in digital magnetic tape transports, in which a magnetic tape is accelerated and decelerated from full speed in either direction of motion within a relatively few milliseconds. These transports require a buffer mechanism of some type to provide a length of loop storage between the high speed reversible drive and the relatively lower speed reels. The buffer mechanisms generally take the form of differential pressure chambers, such as vacuum chambers interposed between the drive system and each of the takeup and supply reels for the tape. Servo systems responsive to one or more conditions of the tape loop, such as the length of the loop and the velocity of the tape, control the reel servo motor so as to tend to maintain the tape loop at a selected position or within a selected region within the chamber. Because of the extremely high tape speeds and acceleration and deceleration rates involved, stringent conditions are imposed upon the reed servo system. These conditions are made even more severe by limitations often imposed on the length of the buffer mechanisms, and by the need to minimize the size and power requirements of the servo motor. While the reel servo system should be economical and reliable in design and operation, it must also meet the dynamics of the system by providing both the necessary response and stability.

In servo systems of this type, stability is generally achieved by added expense through the use of a tachometer feedback signal or a rate derivative signal. Tachometer generators not only complicate the tape path and add an item of expense, but in addition are noisy and subject to certain operating difficulties of their own. Rate derivative damping is itself noisy, susceptible to substantial non-linearities which generally exist in a loop sensing system, and furthermore does not generally introduce adequate damping into the servo.

It is therefore an object of the present invention to provide an improved servo system for controlling the position of a movable member with servo circuits that are economical and reliable but have the necessary response and stabilization characteristics.

Another object of the present invention is to provide an improved reel servo for digital magnetic tape transports.

A further object of the present invention is to provide an improved system for maintaining control of the length of a tape loop in a differential pressure chamber system.

These and other objects are achieved by a system in accordance with the invention that induces successive compensations into a signal representative of tape length, providing corrective components representative of both rates of change of loop position and motor current. The signal representative of motor current is combined with the loop change rate signal, in a sense opposite thereto, and compensates for the lag between motor response and actual tape position. The system generates a continuous bipolar signal that follows the tape position in either direction of operation, and stably controls the reel servomotor under a wide variety of conditions.

In accordance with particular aspects of the invention, a double differentiation circuit responsive to the loop length signal is used to control firing of solid state trigger devices that govern motor energization. The trigger devices are actuated only by signal levels in excess of chosen amplitudes and proper polarities. Motor winding currents are sensed, and the current sense signals are then fed back to the processing circuits. The current sense signals are coupled to low pass filter circuits that minimize the effect of this feedback when the trigger devices rapidly change state.

A better understanding of the invention may be had by reference to the following description, taken in conjunction with the accompanying drawings, in which.

Figure 1:
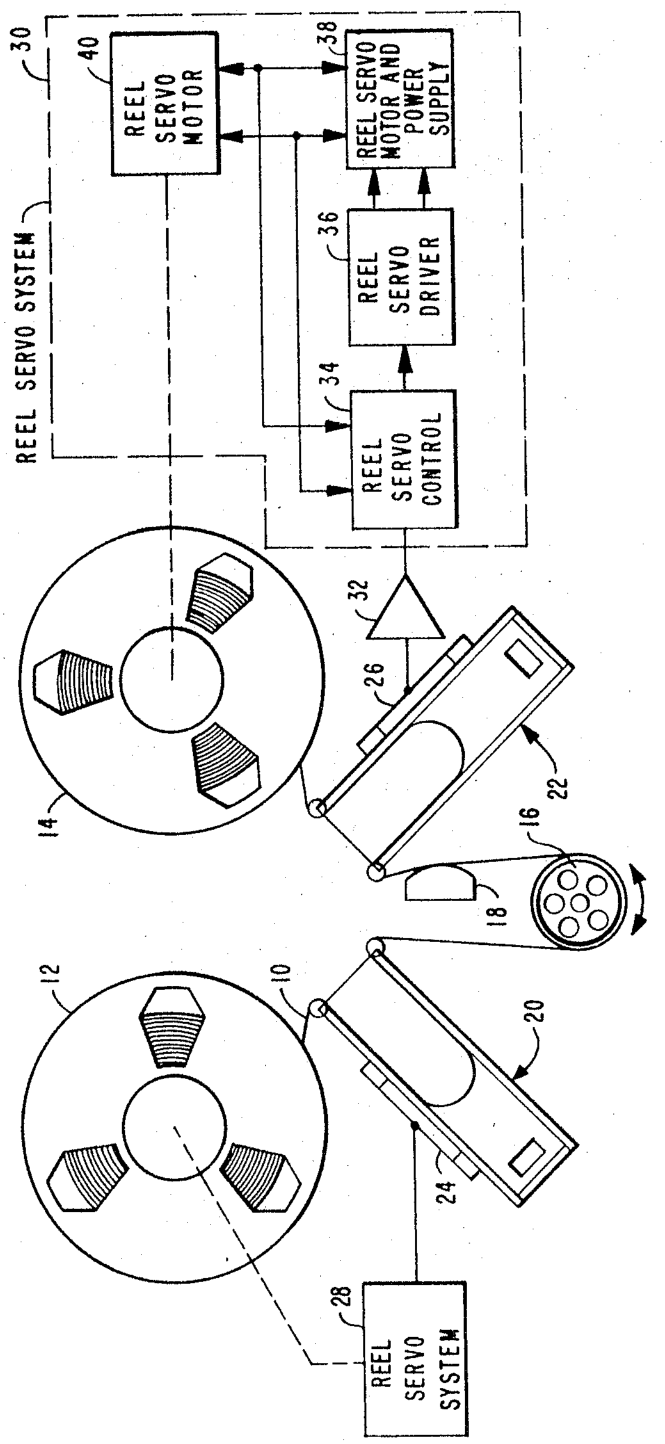
FIG. 1 is an idealized combined block diagram and plan view of a reel servo system in accordance with the invention as utilized in a digital magnetic tape transport.

FIG. 1 illustrates the principal elements of a digital magnetic tape transport utilizing a reel servo system in accordance with the invention. Apart from the reel servo, only the principal elements mounted on a front control panel for the system are shown, and these only in idealized form. The tape 10 is passed between a tape supply reel 12 and a tape takeup reel 14 (the designations "takeup" and "supply" being arbitrary in this instance), across a bidirectional tape drive mechanism, here comprising a single capstan 16 arranged in constant, non-sliding engagement with the tape 10. It will be recognized that the reel servo system may be employed with any conventional tape drive system, including clutch operated single capstan systems and dual, contrarotating, capstan drive systems, whether pinch roller, pneumatically or vacuum actuated. However, a direct drive system of this type, in which the rotation of the capstan is directly controlled from a high torque-to-inertia ratio motor (not shown) is preferred because of the relatively low cost and high reliability of this system. Adjacent the capstan 16, the tape 10 passes a magnetic head assembly 18, at which the desired data transfer operations take place. Between the high speed and rapidly reversible capstan 16 and the relatively higher inertia and higher mass supply and takeup reels 12, 14, the tape is formed into buffer loops in each of a pair of differential pressure chambers 20, 22. In the majority of such systems, the differential pressure chambers 20, 22 are vacuum chambers having open ends for receiving the tape and substantially closed ends with adjacent outlets coupled to appropriate vacuum sources (not shown). Pneumatic systems may also be used, however.

Loop sensor devices 24, 26 (shown only generally in FIG. 1) are mounted along each of the vacuum chambers 20, 22, for providing signals representative of the loop length within the chambers. It is preferred to employ a system that provides a signal varying linearly with loop length within the chamber, such as is described in a copending application of Lester H. Lee entitled Photocell Position Sensing System, Ser. No. 567,761, filed July 25, 1966. That system utilizes a planar light source along one wall of the chamber and a substantially planar light-sensitive element along a different wall of the chamber, with or without a mask of a predetermined shape being interposed between the light source and the light-sensitive element in a fashion to provide the desired linear signal variation.

The signals generated by the loop length sensors 24, 26 are applied to reel servo systems 28, 30, the elements of only one of which are shown in block diagram form in FIG. 1. The signals from the loop length sensor 26 coupled to the reel servo system 30 are applied through a DC preamplifier 32 to reel servo control circuits 34 that generate analog signals representative of loop length signal, including various forms of compensation in accordance with the invention. These analog signals are processed in reel servo driver circuits 36 so as to operate the reel servo motor and power supply 38 to control energization of the reel servo motor 40 in bidirectional intermittent fashion.

As the system of FIG. 1 operates, the capstan 16 is accelerated to full speed in either direction within a relatively few milliseconds, then driven continuously at the high speed, such as 45–180 i.p.s., and decelerated to a stop or changed to full speed in the opposite direction, again within a relatively few milliseconds. The variable length buffer mechanisms formed by the vacuum chambers 20, 22 provide low inertia mechanism for supplying tape to and withdrawing tape from the region of the drive system, while compensating for the slower acceleration capabilities of the supply and takeup reels 12, 14. For example, if the capstan 16 accelerates the tape 10 so as to withdraw tape rapidly from a chamber, the status of the tape loop is sensed by the loop sensor mechanism 24 or 26, and the associated reel servo motor is energized appropriately to tend to maintain the tape loop at a selected point or within a chosen range in the chamber 20 or 22. Both fast response and stability are needed for the reel drive servo, in view of the fact that the drive commands are essentially arbitrary but change extremely rapidly. For compactness and economy, it is desired to maintain the lengths of the vacuum chambers 20, 22 as short as possible, while keeping the reel servo motors as small as feasible, without sacrificing response or stability. If the servo response rate is not adequate, the tape will tend to become too long or too short within the chamber under certain sequences of commands, with control being lost or an interlock system operated to prevent the possibility of tape damage. Increase of the frequency response characteristic alone is not fully adequte, because stability ordinarily is lessened. Because of the arbitrary command sequences that may be applied, stability is a primary requirement and problem for reel servos.

Figure 2:
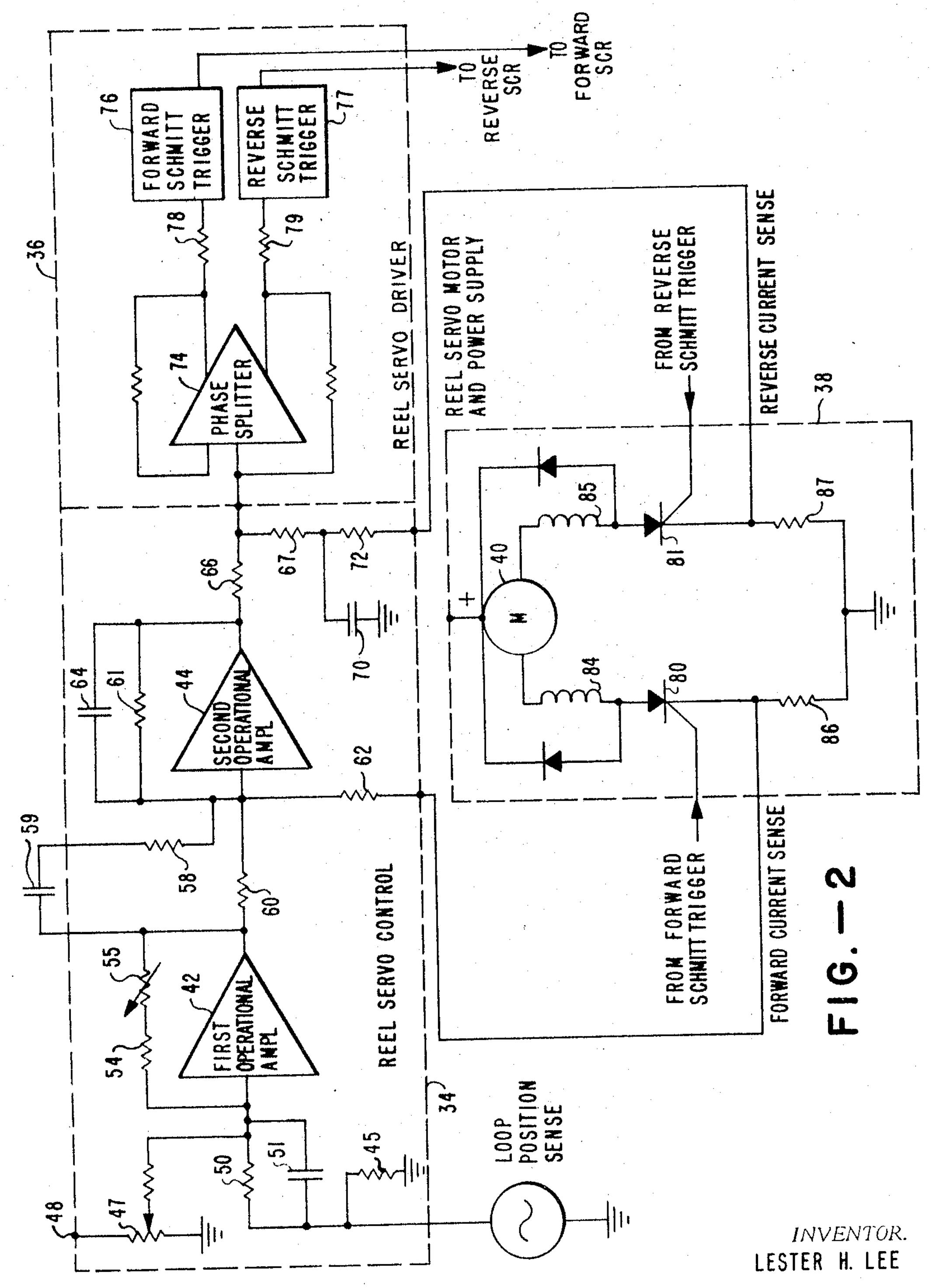
FIG. 2 is a schematic diagram of a preferred example of circuits utilized in the arrangement of FIG. 1.

A specific example of a stabilized, high response reel servo in accordance with the invention is shown in the schematic diagram of FIG. 2. In FIG. 2 the reel servo control 34 comprises first and second operational amplifiers 42, 44. A summing network coupled to the input of the first operational amplifier 42 receives a signal derived from the loop position sensor (FIG. 1), taken through a load resistor 45. The summing network also receives a loop position bias signal derived from an adjustable potentiometer 47. The bias signal level is subtracted from the loop position signal, and is set so as to establish a null at a selected loop position in the chamber, generally slightly longer than half the length of the chamber. The loop position signal is made to oppose the bias signal, by selection of the polarity of the voltage supply 48 to which the potentiometer 47 is coupled. An RC network, comprising a resistor 50 and parallel coupled capacitor 51, is also coupled to the summing junction, together with the feedback circuit, here a pair of resistors 54, 55, conventionally employed with an operational amplifier. The RC circuit provides a first differentiation of the input signal at the first operational amplifier 42, effectively increasing the amplifier gain when the loop position signal changes rapidly.

A second summing junction, at the input to the second operational amplifier 44, receives the output of the first operational amplifier 42 through an RC network, comprising a resistor 58 and series capacitor 59 in shunt with a resistor 60. This RC network provides a second differentiation of the signal. The summing junction also is coupled to a feedback resistor 61 for the amplifier 44 and a level-adjust resistor 62 coupled to a selected point in the reel servo motor and power supply circuit 38, and carrying what may be termed a forward current sense signal. A decoupling capacitor 64 shunts the feedback resistor 61 to define a low pass filter for a purpose to be described below.

At the output terminal of the second operational amplifier 44, the output signal is combined at the junction between a pair of current summing resistors 66, 67, the second of which is connected to a second low pass filter comprising a decoupling capacitor 70 and a resistor 72. The second low pass filter is coupled to a different selected point in the reel servo motor and power supply circuit 38, and receives what is hereafter termed the reverse current sense signal.

The signal at the output of the reel servo control circuit 34 is then applied, in the reel servo drive 36, to a phase splitter circuit 74, the two outputs of which are individually applied to separate Schmitt triggers 76, 77 designated the forward and reverse Schmitt triggers respectively. Each of these trigger circuits 76, 77 is coupled to the control electrode of a different silicon-controlled rectifier 80, 81 in the reel servo motor and power supply 38, these silicon-controlled rectifiers (hereafter SCR) being designated the forward and reverse SCR's respectively. In the reel servo driver circuits 36, the input signals to the forward and reverse Schmitt triggers 76, 77 are derived through resistors 78, 79 that delay operation of the Schmitt triggers until selected amplitudes are reached.

In the reel servo motor and power supply circuits 38, each SCR 80 or 81 is coupled in series with a different sense winding 84 or 85 respectively of the motor 40. Current sense resistors 86, 87 coupled to the forward and reverse SCR's 80, 81 respectively are utilized to establish terminal points from which the current sense signals are returned through the resistors 62, 72 respectively to the reel servo control 34.

In the operation of the system of FIG. 2, the potentiometer 47 is balanced against the loop position sense input, to establish the null at a selected steady state level. Assuming the tape loop is stationary at the null position, acceleration in either direction results in the summed signal being driven positive or negative, dependent upon the direction. The first differentiation in the RC network 50, 51 increases the signal amplitude during the interval of rapid change. The output signal is again differentiated by the RC network 58, 59, 60 so that during the most rapid change interval the signal is sharply increased. The output signal from the first operational amplifier 42 is thus a bipolar analog signal providing components representing the rate and direction of change of loop length, as well as loop length itself. The second operational amplifier 44 provides an inverted signal that is largely representative of tape loop velocity during the start of acceleration and deceleration intervals.

The forward current sense and reverse current sense signals in the reel servo motor and power supply circuit 38, however, permit the use of higher voltage gains in both the reel servo driver 36 and the reel servo motor and power supply 38. The couplings of the forward and reverse current sense signals to the input and output respectively of the second operational amplifier 44, establish the current gain of the power amplifier stage. The two current sense signals also compensate for the lag due to the Schmitt trigger and the inductance of the motor windings. Assume, for example, that the output signal from the second operational amplifier 44 starts to increase in the polarity sense needed to fire the forward Schmitt trigger 76. When this signal reaches a threshold determined by the value of the resistor 78, the forward Schmitt trigger 76 is fired, turning on the forward SCR 80. The forward winding 84 is energized, and current flow commences, to cause the motor 40 to rotate so as to correct the tape loop. After the SCR 80 fires, the forward current sense signal builds up rapidly, opposing the tape loop velocity component, before the reel reaches full speed. Due to this opposition of the signals, the tape loop position component of the signal becomes the primary controlling factor in the error signal, instead of being overridden by the tape loop velocity signal as might otherwise be the case. Allowance is thereby made for motor lag, and the system rapidly seeks the null position. When the compensated signal derived from the second operational amplifier 44 returns to a low amplitude, the tape loop is close to the selected null position, and the associated Schmitt trigger 76 or 77 is turned off, quenching the appropriate SCR 80 or 81. Through the use of this arrangement, the system is triggered on and off in simple fashion, but a dead band is established that maintains the servo system inactivated until such time as a significant correction is required.

The operating features of the circuit are further enhanced by the low pass filters used at the input and output circuits of the second operational amplifier 44, in conjunction with the forward and reverse current sense signals respectively.

The low pass filter circuits effectively integrate the current sense signals in the same fashion even though one is in the feedback circuit and the other is in the circuit from the reverse winding 85. At high program rates, in which the commands for the drive system are repeatedly changed, the current sense signal would normally tend to swamp out the position signal. The integration or low pass filter effect acts to decouple the current sense circuits at the high program rates.

The capacitor 70 also serves to filter out any signal component in the double differentiated signal that tends to make the loop jump, maintaining the loop under position rather than velocity control.

This arrangement compensates for rate of change of the tape loop, as well as motor lag, in both the forward and reverse directions, and during reel servo motor acceleration as well as deceleration. Consequently, a continuous, bipolar position signal is generated for controlling the firing of the SCR's, and the system has adequate stability and response for all operating conditions.

While there have been described above and illustrated in the drawings one form of reel servo motor control circuit in accordance with the invention, it will be appreciated that the invention is not limited thereto but includes all modifications and variations falling within the scope of the appended claims.

What is claimed is:

1. A servo system for operating motor means to control the position of a movable member, the motor means having forward and reverse windings and being coupled to vary the position of the member, comprising:

position sensing means providing a signal representative of the position of said movable member;

current sensing means responsive to energization of said motor means;

servo control means responsive to signals received from said position sensing means and from said current sensing mean for generating servo error signals, the servo control means including means for differentiating the position sensing signal to provide a velocity component, the current sense signals being applied in senses opposing said velocity component such that the position component of the servo error signal predominates after the motor has been energized during acceleration and deceleration intervals; and means responsive to said servo error signals for selectively energizing said forward and reverse windings.

2. A reel servo system for magnetic tape transports of the type using tape loop storage members comprising:

loop position sensing means providing a signal representative of the loop length of a tape loop positioned within one of said storage members;

DC motor means having forward and reverse windings;

current sensing means responsive to energization of said motor means;

servo control means responsive to signals received from said loop position sensing means and from said current sensing means for generating servo error signals, said servo control means including first differentiating means for differentiating the position sensing signal to provide a velocity component, the current sense signals being applied in senses opposing said velocity component, such that the position component of the servo error signal predominates after the motor has been energized during acceleration and deceleration intervals;

second differentiating means for differentiating the signal received from said first differentiating means; and means responsive to said servo error signals for selectively energizing said forward and reverse windings.

3. The invention as set forth in claim 2 above, further including low pass filter means for eliminating high frequency fluctuations within the servo system, said low pass filter means comprising a pair of RC networks, the first of which is coupled in a feedback loop about said second differentiating means, and the second of which is coupled to the output of said second differentiating means.

4. A servo system for operating motor means to control the position of a movable member, the motor means having forward and reverse windings and being coupled to vary the position of the member, comprising:

position sensing means providing a signal representative of the position of said movable member;

firing means for selectively energizing said forward and reverse windings;

current sensing means responsive to energization of said motor means;

servo control means responsive to signals received from said position sensing means and from said current sensing means for generating servo error signals;

firing control means responsive to said servo error signals for controlling said firing means; and low pass filter means coupled to a plurality of said current sensing means and said servo control means.

5. The invention as set forth in claim 4 above, wherein said servo control means includes first differentiating means for differentiating the position sensing signal, and second differentiating means for differentiating the signal received from said first differentiating means, and wherein said current sensing means comprises a first current sensing winding coupled to the forward windings of said motor means and to said second differentiating means, and a second current sensing winding coupled to said reverse winding and to said second differentiating means at a point having an inverse polarity relationship to said first current sensing winding.

6. The invention as set forth in claim 5 above, wherein said first differentiating means includes biasing means coupled in additive relation to the position sensing signal for providing a bipolarity output signal from said first differentiating means with a null at a selected level determined by the bias.

7. The invention as set forth in claim 5, wherein said low pass filter means comprises a pair of RC networks, the first of which is coupled in a feedback loop about said second differentiating means, and the second of which is coupled to the output of said second differentiating means.

8. The invention as set forth in claim 4 above, wherein said servo control means includes means providing a continuous doubly-differentiated bipolarity signal for controlling said motor, and said current sensing means provides signals in opposition thereto.

9. The invention as set forth in claim 4 above, wherein said firing means includes forward and reverse SCR's coupled to control energization of the forward and reverse windings respectively, and wherein said firing control means comprises phase splitter means coupled to said second differentiating means, and forward and reverse firing circuits coupled to separate outputs of said phase splitter means responsive to signals appearing thereat for controlling the forward and reverse SCR's respectively.

10. The invention as set forth in claim 9 above, wherein said firing circuits include forward and reverse Schmitt triggers coupled to separate outputs of said phase splitter means and to said forward and reverse SCR's, respectively.

References Cited

UNITED STATES PATENTS

| | | | |
|---|---|---|---|
| 3,060,358 | 10/1962 | Peeples et al. | 318—6 |
| 3,248,067 | 4/1966 | Kienle | 242—55.12 |
| 3,343,052 | 9/1967 | Youngstrom | 318—6 |

BENJAMIN DOBECK, Primary Examiner

B. A. COOPER, Assistant Examiner

U.S. Cl. X.R.

242—55.12, 75.51